United States Patent [19]

Carmien

[11] Patent Number: 5,643,520
[45] Date of Patent: Jul. 1, 1997

[54] PROCESS FOR MANUFACTURING A BOW RAKE

[76] Inventor: Joseph Allen Carmien, 525 N. Maple Dr., Beverly Hills, Calif. 90210

[21] Appl. No.: 374,927

[22] Filed: Jan. 18, 1995

[51] Int. Cl.$^6$ .......................... B29C 33/02; B29C 45/14; B29C 65/18

[52] U.S. Cl. .......................... 264/249; 264/250; 264/274; 264/319; 264/DIG. 44; 29/458; 29/525

[58] Field of Search .......................... 264/249, 250, 264/239, 241, 255, 274, 275, 266, 313, 221, DIG. 44, 319, 265, 294; 29/458, 525

[56] References Cited

U.S. PATENT DOCUMENTS

| | | | |
|---|---|---|---|
| 1,225,343 | 5/1917 | McDonell | 264/249 |
| 2,052,616 | 9/1936 | Gardes | 264/249 |
| 2,238,104 | 4/1941 | Finley . | |
| 2,517,902 | 8/1950 | Luebkeman . | |
| 2,948,649 | 8/1960 | Pancherz . | |
| 3,018,140 | 1/1962 | Portz et al. . | |
| 3,189,672 | 6/1965 | Lyman, Jr. | 264/249 |
| 3,232,355 | 2/1966 | Woolworth . | |
| 3,497,952 | 3/1970 | King et al. | 264/249 |
| 4,424,183 | 1/1984 | Nelson . | |
| 4,570,988 | 2/1986 | Carmien . | |
| 4,605,254 | 8/1986 | Carmien . | |
| 4,719,063 | 1/1988 | White | 264/271.1 |
| 4,743,481 | 5/1988 | Quinlan et al. . | |
| 5,123,304 | 6/1992 | Carmien . | |
| 5,213,014 | 5/1993 | Carmien . | |
| 5,262,113 | 11/1993 | Carmien . | |
| 5,310,230 | 5/1994 | Carmien . | |

FOREIGN PATENT DOCUMENTS

| | | | |
|---|---|---|---|
| 1238806 | 7/1960 | France | 264/249 |
| 129611 | 10/1950 | Sweden . | |
| 2093398 | 9/1982 | United Kingdom . | |
| 2555098 | 5/1985 | United Kingdom . | |
| PCT/SE84/ 00036 | 2/1984 | WIPO . | |

*Primary Examiner*—Angela Ortiz
*Attorney, Agent, or Firm*—Kelly Bauersfeld Lowry & Kelley, LLP

[57] ABSTRACT

In a process for manufacturing a bow rake, an outer plastic encasement is molded over a structural skeleton to form a cross-head including a handle-receiving socket and a plurality of spaced-apart tines. An elongated claw is pressed into an end of each tine, and an end of a handle is securing within the handle-receiving socket. In manufacturing the cross-head, one or more voids in the structural skeleton are filled with a selected flowable filler material which provides a structural backstop to maintain the shape integrity of the hollow skeleton during the molding step. Some or all of the filler material is removed from the skeleton subsequent to the molding step. Prior to pressing the claws into the tines, the claws are heated and then secured on a ram. The cross head is placed in a stationary jig in alignment with the ram, and the heated claw is then pressed into the selected tine. A similar process is utilized to connect the handle to the cross-head.

11 Claims, 3 Drawing Sheets

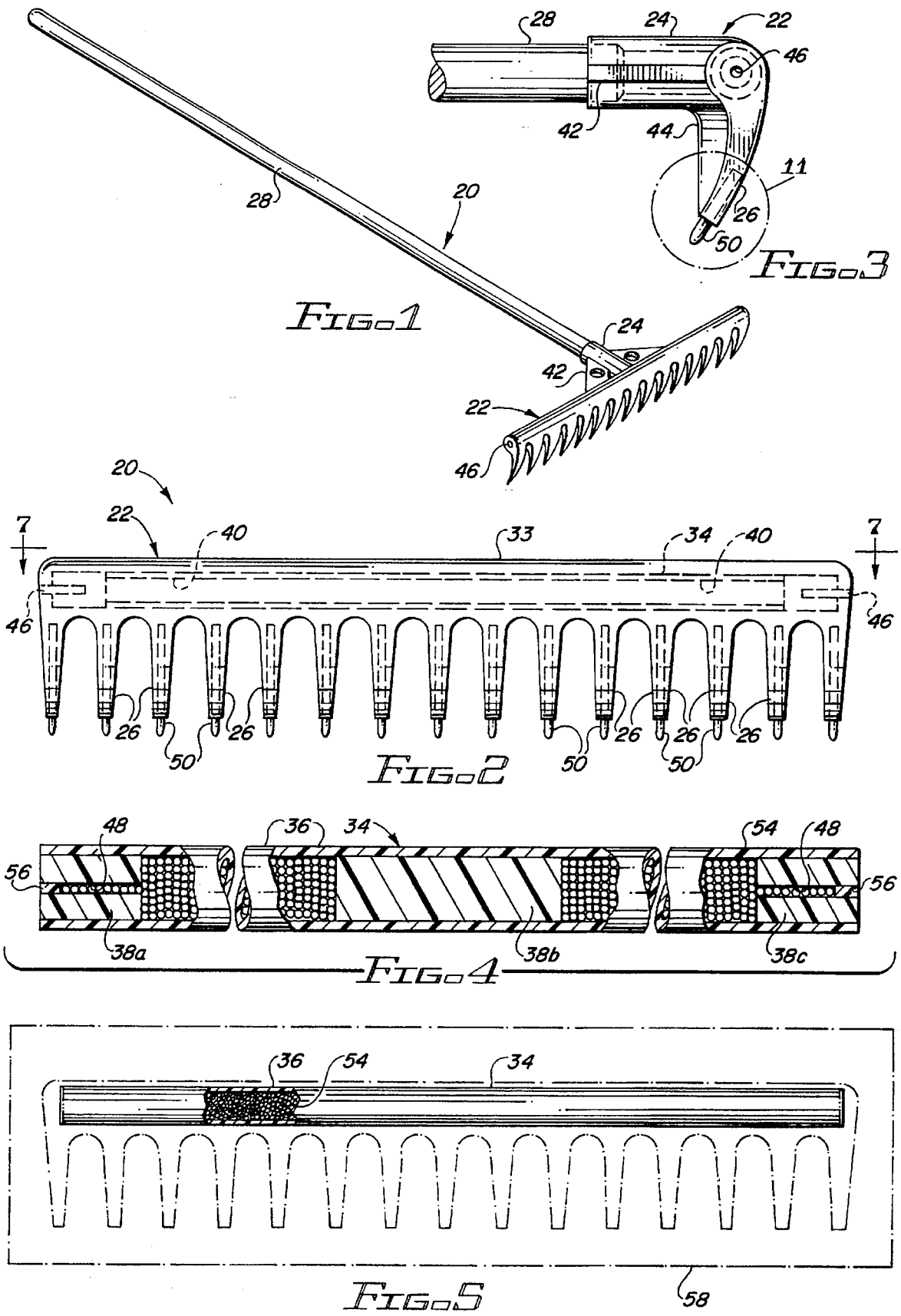

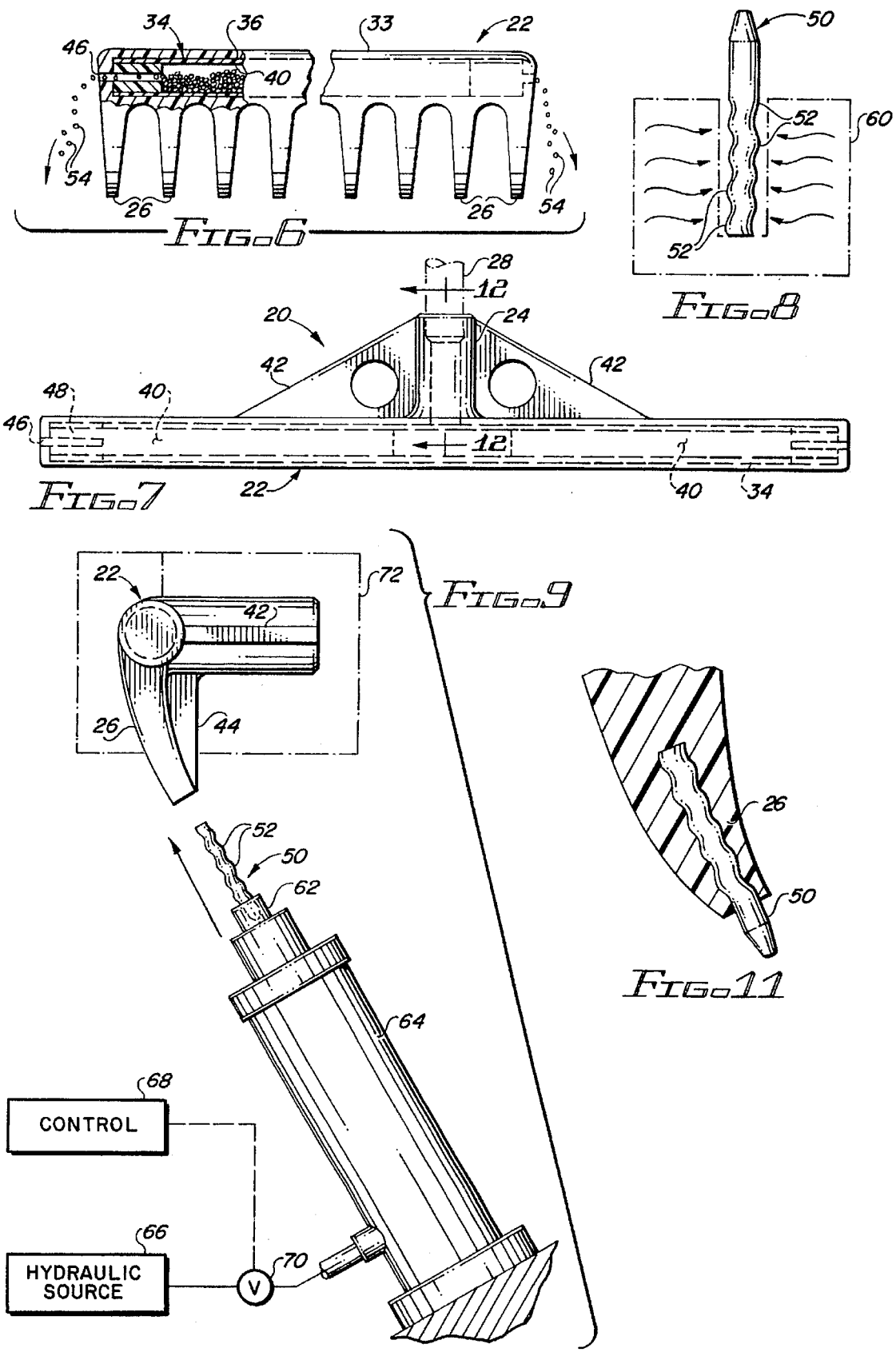

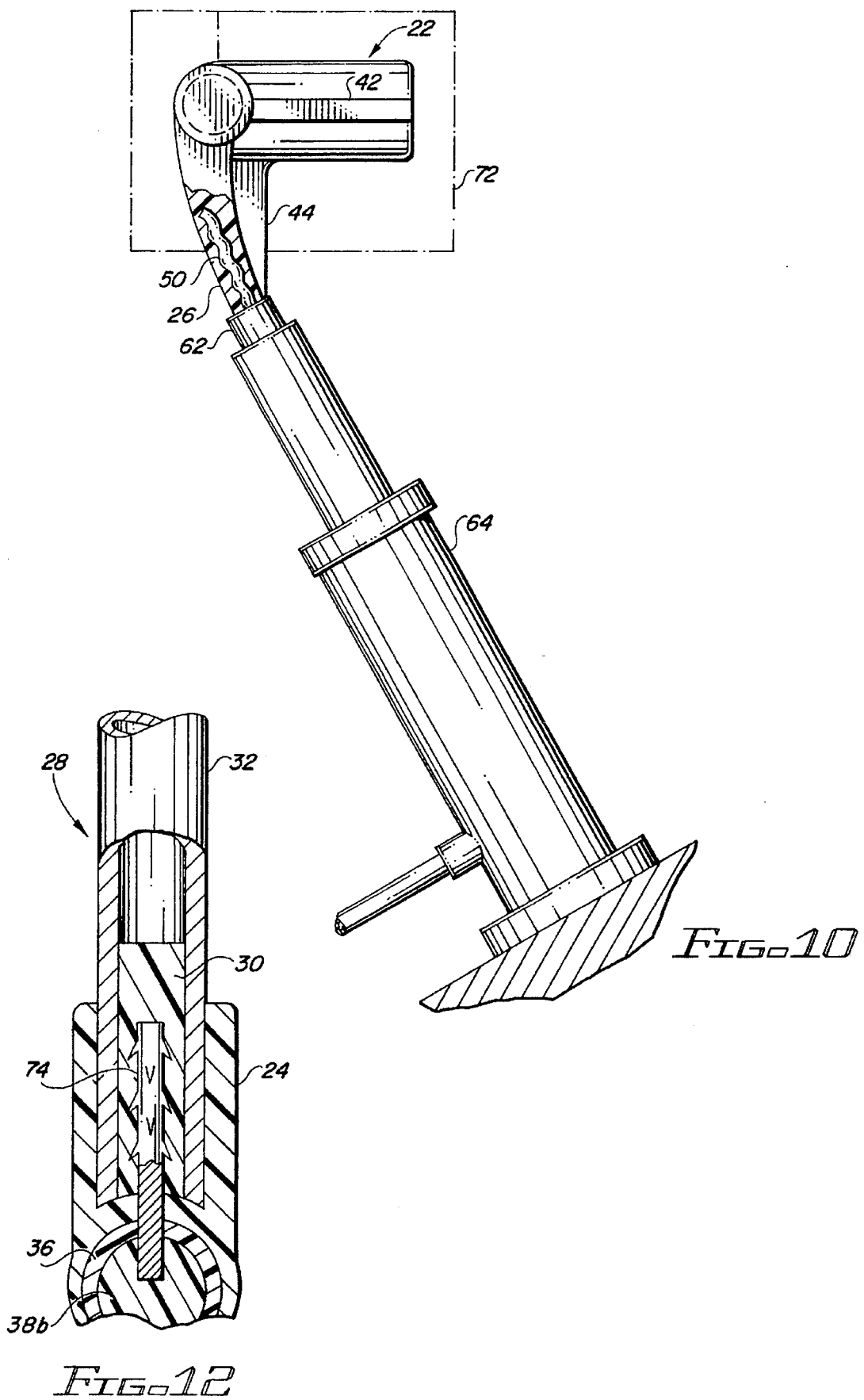

PROCESS FOR MANUFACTURING A BOW RAKE

BACKGROUND OF THE INVENTION

This invention relates generally to processes for manufacturing hand tools. More specifically, the present invention relates to a novel process for manufacturing a bow rake.

The traditional bow rake, primarily used in gardening but also widely used in connection and other related fields, comprises a piece of forged or stamped steel with integral teeth or tines. Usually there are from twelve to twenty four teeth or tines across the width of the bow rake, which are one inch to two inches long, depending on the model and intended use of the bow take. Bow rakes are typically utilized in raking operations not performed by so-called leaf rakes, such as raking up debris around construction sites, and small limbs and twigs. Bow rakes can be constructed in various grades of durability and performance, but as a general rule the heavier the thickness or size of the tines, the heavier the work that may be performed with a particular bow rake.

As in many existing tools, the rake head must accomplish several functions, such as providing: a method by which to attach the head to the handle; a frame to which the tines are attached or project from; a bow to provide stiffness for the outer extremities of the rake head; and a tough and/or hard surface to the tines. The object is to create enough stiffness and durability in the bow rake for its intended use. Thus, the frame, the bow, the handle attachment and the tine sizes may vary in regard to the level of duty that the rake is going to be called upon to perform.

Since all of the component parts of the rake head are forged or stamped from one piece of steel, and in view of the fact that the various component parts of the rake head performed different functions, concessions are made to one component or another so that the properties of the various components of the rake head are averaged out to form an "acceptable" tool head. This approach, however, leads to the manufacture and use of tool heads which are less than ideal simply because all of the component parts of the rake head cannot be optimized during standard manufacturing operations.

Accordingly, there is a need for a new bow rake wherein the rake head is manufactured of separate components designed to give optimum performance and greater reliability at lower cost in comparison with the standard bow rake head. The present invention fulfills this need and provides other related advantages.

SUMMARY OF THE INVENTION

The present invention resides is a novel process for manufacturing a bow rake. The process comprises the steps of molding a cross-head to include a handle-receiving socket and a plurality of spaced-apart tines, pressing an elongated claw into an end of each tine, and securing an end of a handle within the handle receiving socket. Typically, the molding step comprises the step of molding an outer encasement over a structural skeleton.

In a preferred form of the invention, the molding step comprises the steps of filling one or more voids within the structural skeleton with a selected flowable filler material, closing an access port formed in the structural skeleton subsequent to the filling step, molding an outer encasement about the exterior of the structural skeleton whereby the filler material provides a structural backstop to maintain the shape integrity of the structural skeleton during the outer encasement molding step, and then removing some or all of the filler material from the structural skeleton through the access port. Preferably the molding step comprises an injection molding step to form a plastic outer encasement on the structural skeleton. The filling step comprises filling one or more voids of the structural skeleton with small rigid pellets. The structural skeleton itself comprises an elongated tubular member having a fiber-resin jacket and one or more reinforcing cores disposed within the fiber-resin jacket.

The pressing step includes the steps of heating the claws to a temperature within the range of 300° F. to 500° F. The claws are each provided surface irregularities and are preferably heated in a heating block prior to aligning an end of a selected tine including a thermoplastic section, with an end of a claw. In this regard, the claw is placed in an hydraulic ram, and the cross-head is placed in a stationary jig so as to align the selected tine with the ram. The hydraulic ram is actuated to drive the heated claw into the thermoplastic section of the selected tine such that as the heated claw engages the tine, the thermoplastic section is softened to permit entry of the claw whereby the thermoplastic material of the thermoplastic section flows into intimate contact around the claw and then hardens as the heat of the claw is dissipated to hold the claw in place. An elongate claw-receiving channel is provided in the thermoplastic section of each tine which has cross-sectional dimensions that are less than the cross-sectional dimensions of the claw. The interference between the cross-sectional dimensions of the claw and the cross-sectional dimensions of the claw receiving channel is within the range of 0.015 inch to 0.025 inch.

The securing step comprises the steps of providing a connecting stud having one end secured within the cross-head and another end extending into the handle-receiving socket. The connecting stud is then heated and the end of the handle is driven into the handle-receiving socket such that the connecting stud is driven into the thermoplastic section of the handle. As the heated connecting stud engages the tool handle, the thermoplastic section is softened to permit entry of the connecting stud whereby the thermoplastic material of the thermoplastic section flows into intimate contact around the connecting stud and then hardens as the heat of the connecting stud is dissipated to hold the handle in place.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a bow rake manufactured in accordance with the process of the present invention;

FIG. 2 is an enlarged front elevational view of the bow rake illustrated in FIG. 1;

FIG. 3 is an enlarged, fragmented left side elevational view of the bow rake illustrated in FIG. 1;

FIG. 4 is an enlarged, fragmented and partially sectional view of a structural skeleton illustrated in phantom in FIG. 2, which forms a portion of a cross-head of the bow rake, wherein the structural skeleton includes a fiber-resin jacket and a plurality of reinforcing cores disposed therein which define voids;

FIG. 5 is a schematic illustration showing placement of the structural skeleton of FIG. 4 within a mold for the cross-head, wherein the voids within the structural skeleton are filled with a flowable filler material;

FIG. 6 is a fragmented partially sectional front elevational view of the cross-head after an outer encasement is molded about the structural skeleton, illustrating removal of the flowable filler material from within the structural skeleton;

FIG. 7 is an enlarged, fragmented top plan view of the bow rake of FIG. 1;

FIG. 8 is a schematic illustration showing placement of a claw within a heating block;

FIG. 9 schematically illustrates the steps of placing the heated claw within an end fitting of a hydraulic ram, and placing the cross head within a stationary jig to align a selected tine with an end of the claw;

FIG. 10 is a schematic illustration similar to that shown in FIG. 9, showing the step of actuating the hydraulic ram to drive the heated claw into the aligned tine;

FIG. 11 is an enlarged, fragmented, partially sectional view of the claw attached to the tine, taken generally of the area indicated by the arrow 11 of FIG. 3; and FIG. 12 is an enlarged fragmented and partially sectional view taken generally along the line 12—12 of FIG. 7, illustrating one method of attaching a handle within the handle receiving socket.

DETAILED DESCRIPTION OF THE PREFERRED EMBODIMENT

As shown in the drawings for purposes of illustration, the present invention is concerned with a novel process for manufacturing a bow rake, generally designated in the accompanying drawings by the reference number 20. The rake 20 comprises, generally, a molded cross-head 22 which includes a rearwardly extending handle-receiving socket 24 and a plurality of generally downwardly extending spaced-apart tines 26, and a handle 28 which has one end secured within the handle receiving socket 24. The tool handle 28 is preferably of the fiber-resin composite type shown and described in U.S. Pat. Nos. 4,570,988 and 4,605,254, the contents of which are incorporated herein.

In manufacturing a typical fiber-resin composite tool handle, a fiber material is drawn through a resin bath and into a die tube where the resin is cured. As the fibers enter the die tube, alternating sections of a hollow tubing and a solid reinforcing core of a thermoplastic material are inserted into the center of the die tube and are simultaneously surrounded by the fibers and drawn into and through the die tube. By this method a continuous hollow fiberglass rod can be quickly and easily manufactured with a reinforced thermoplastic section 30 provided at any location within a fiber-resin jacket 32, such as at an end of the tool handle 28 to be inserted into the handle receiving socket 24.

The cross-head 22 comprises a thermoplastic outer encasement 33 which is molded over a structural skeleton 34 (see FIGS. 4–6). The structural skeleton 34 is a rod-like member manufactured in accordance with the same process utilized to manufacture the handle 28. Thus, the structural skeleton 34 includes its own fiber resin jacket 36 and three reinforcing cores 38a–c located at positions within the jacket 36 which are likely to experience the greatest stresses. The fiber-resin jacket 36 defines generally hollow voids 40 between the reinforcing cores 38 so as to minimize the weight of the fully manufactured cross-head 22.

The encasement 33 molded about the structural skeleton 34 creates the handle receiving socket 24 and the tines 26. A pair of gussets 42 are provided to support the handle receiving socket 24, and additional gussets 44 are provided to support each tine 26. A small bore 46 is provided through the encasement 33 at each end of the cross-head 22 in alignment with bores 48 in the reinforcing cores 38a and 38c. As will be described hereinafter, these aligned bores provide access to the voids 40.

Bores are provided through the ends of the tines 26 through which claws 50 are inserted to provide a ground-engaging member for the bow rake 20. The claws 50 have corrugations 52 along their length to facilitate securing the claws within the tines 26 in accordance with a method to be more fully discussed hereinafter (see FIGS. 8–11). The claws 50 may be manufactured of a tough and durable composite material or, alternatively, the claws 50 may be made of metal.

In accordance with the process of the present invention, and with reference to FIGS. 4–12, during formation of the outer encasement 33 of the cross-head 22, the voids 40 of the structural skeleton 34 are substantially filled and structurally backstopped by a flowable filler material 54 to enable the adjacent portions of the fiber resin jacket 36 to withstand injection molding pressure and temperature conditions. The voids 40 are filled with the flowable filler material 54 through the bores 48 in the reinforcing cores 38a and 38c. The bores 48 are then plugged by a removable end cap 56. The filler material 54 is selected to provide substantial structural or backstop reinforcement to the otherwise unreinforced section of the fiber-resin jacket 36. While the specific filler material 54 may vary, a preferred material comprises small pellets of stainless steel shot or the like, having a diametric size on the order of 0.005 inch.

The structural skeleton 34 containing the filler material 54 is placed into a mold cavity of an injection mold 58. Appropriate locator pins (not shown) are typically provided to support the structural skeleton 34 in a predetermined spaced relation with surfaces of the surrounding mold 58, thus defining a space into which a selected plastic molding material may be injected under appropriate conditions of temperature and pressure. The plastic molding material is permitted to cure, thus defining the outer encasement 33 of the cross-head 22 for the bow rake 20. Once again, a variety of plastic encasement materials may be used of a type known in the art in the construction of plastic encased tool components. Pressure and temperature conditions for such materials run typically on the order of 3,000 PSI and 300° F. to 400° F. During the injection molding process, the filler material 54 effectively retains the portions of the fiber-resin jacket 36 defining the voids 40 against compressive deformation or other damage.

When the plastic encasement 33 of the cross-head 22 is suitably cured, the cross-head is removed from the mold 58. The end caps 56 are then removed (FIG. 6) to permit the filler material 54 to be drained from the voids 40. The filler material 54 can be reused in the course of injection molding steps for subsequent tool components.

With the cross-head 22 of the bow rake 20 thus formed, assembly is completed by attaching the claws 50 to the tines 26, and the handle 28 within the handle receiving socket 24. With regard to attachment of the claws 50 to the tines 26, and as shown in FIGS. 8–11, each tine 26 is provided with an elongate claw receiving channel or bore which, preferably, has cross-sectional dimensions which are less than the cross-sectional dimensions of the claws 50. This ensures at least a minimal level of interference between the thermoplastic tine 26 and the claw 50 when the claw is driven into the tine. This interference is typically within the range of 0.015 inch to 0.025 inch, and ideally about 0.020 inch.

The claws 50 are placed within a heating block 60 and are heated to a temperature sufficient to cause the thermoplastic material of the tines 26 surrounding the claw receiving channel to flow into intimate contact with the claws 50 as they are driven into the tines 26. Accordingly, it is preferred that the claws 50 be heated to a temperature within the range of 300° F. to 500° F., depending on the thermoplastic selected.

Once the claws have been sufficiently heated, they are placed in an end fitting 62 of a hydraulic ram 64 which is connected to a suitable hydraulic source 66 and control 68 through a valve means 70. The cross-head 22 is placed within a stationary jig 72 so as to align a selected tine 26 with the claw 50 (FIG. 9), and then the hydraulic ram 64 is actuated to press the claw 50 into the claw-receiving channel of the selected tine 26. (See FIG. 10). The thermoplastic material of the tine 26 conducts heat away from the claw 50 and hardens as the heat of the claw is dissipated to hold the claw in place. Assuming that a fitting on the hydraulic ram 64 is provided to hold heated claws 50 for each of the tines 26 of the cross-head 22, all of the claws 50 may be assembled to the cross-head 22 in one continuous operation.

The tool handle may be attached to the cross-head 22 within the handle receiving socket 24 utilizing either the "heat-drive" method employed to attach the claws 50 within the tines 26, or by simply providing mating screw-threads within the handle receiving socket 24 and at the end of the handle 28. As shown in FIG. 12, a connecting stud 74 may be embedded within a central portion of the structural skeleton 34 and the central reinforcing core 38b as well as a portion of the thermoplastic encasement 33 of the cross-head 22. This connecting stud 74 may be heated much like the claws 50, and then a thermoplastic section situated at and end of the handle 28 driven over the connecting stud to connect the handle 28 to the cross-head 22.

From the foregoing it is to be appreciated that the novel process for manufacturing a bow rake as described in detail above provides an efficient means for manufacturing tool components having precisely the most desirable weight, strength and durability characteristics as needed for the intended application. For example, the molded encasement 33 of the cross-head 22 around the structural skeleton 34 may be polypropylene for lighter duty applications, or a glass-filled nylon for heavier duty applications.

Although a particular embodiment of the invention has been described in detail for purposes of illustration, various modifications may be made without departing from the spirit and scope of the invention. Accordingly, the invention is not to be limited, except as by the appended claims.

I claim:

1. A process for manufacturing a bow rake, comprising the steps of:

molding an outer encasement over a structural skeleton to form a cross-head for the bow rake including a handle-receiving socket and a plurality of spaced-apart tines;

heating a claw;

aligning an end of a selected tine including a thermoplastic section with an end of the heated claw;

driving the heated claw into the thermoplastic section of the selected tine such that as the heated claw engages the tine the thermoplastic section is softened to permit entry of the claw whereby the thermoplastic material of the thermoplastic section flows into intimate contact around the claw and then hardens as the heat of the claw is dissipated to hold the claw in place; and securing an end of a handle within the handle receiving socket.

2. The process of claim 1, wherein the molding step comprises the steps of filling one or more voids within the structural skeleton with a selected flowable filler material, molding an outer encasement about the exterior of the structural skeleton, whereby the filler material provides a structural backstop to maintain the shape integrity of the structural skeleton during the outer encasement molding step, and removing some or all of the filler material from the structural skeleton subsequent to the outer encasement molding step.

3. The process of claim 2, wherein the filling step comprises filling the one or more voids of the structural skeleton with small rigid pellets, and wherein the structural skeleton comprises an elongated tubular member having a fiber-resin jacket and one or more reinforcing cores disposed within the fiber-resin jacket.

4. The process of claim 1, including the step of providing an elongate claw receiving channel in the thermoplastic section of the tine such that the cross-sectional dimensions of the claw receiving channel are less than the cross-sectional dimensions of the claw, and wherein during the aligning step the heated claw is positioned adjacent to and in alignment with the claw receiving channel, and wherein the interference between the cross-sectional dimensions of the claw and the cross-sectional dimensions of the claw receiving channel is within the range of 0.015 inch to 0.025 inch.

5. The process of claim 1, wherein the claw is provided surface irregularities and is heated in a heating block within the range of 300° F. to 500° F. prior to alignment with the selected tine, and wherein the aligning step includes the steps of placing the claw in a ram, and placing the cross-head in a stationary jig so as to align the selected tine with the claw.

6. The process of claim 1, wherein the securing step comprises the steps of providing a connecting stud having one end secured within the cross head and another end extending into the handle-receiving socket, heating the connecting stud, and driving the end of the handle into the handle-receiving socket such that the connecting stud is driven into a thermoplastic section of the handle such that as the heated connecting stud engages the tool handle, the thermoplastic section is softened to permit entry of the connecting stud whereby the thermoplastic material of the thermoplastic section flows into intimate contact around the connecting stud and then hardens as the heat of the connecting stud is dissipated to hold the handle in place.

7. A process for manufacturing a bow rake, comprising the steps of:

molding a cross-head to include a handle-receiving socket and a plurality of spaced-apart tines, the molding step including the steps of filling one or more voids within a structural skeleton with a selected flowable filler material, and molding an outer encasement about the exterior of the structural skeleton, whereby the filler material provides a structural backstop to maintain the shape integrity of the structural skeleton during the outer encasement molding step;

attaching a claw at an end of each tine; and securing an end of a handle within the handle receiving socket.

8. The process of claim 7, wherein the attaching step includes the steps of heating the claw, aligning an end of a selected tine including a thermoplastic section with an end of the claw, and driving the heated claw into the thermoplastic section of the selected tine such that as the heated claw engages the tine the thermoplastic section is softened to permit entry of the claw whereby the thermoplastic material of the thermoplastic section flows into intimate contact around the claw and then hardens as the heat of the claw is dissipated to hold the claw in place.

9. The process of claim 7, wherein the securing step comprises the steps of providing a connecting stud having one end secured within the cross head and another end extending into the handle-receiving socket, heating the connecting stud, and driving the end of the handle into the handle-receiving socket such that as the heated connecting stud engages the tool handle the thermoplastic section is softened to permit entry of the connecting stud whereby the thermoplastic material of the thermoplastic section flows into intimate contact around the connecting stud and then hardens as the heat of the connecting stud is dissipated to hold the handle in place.

10. The process of claim 7, including the step of removing some or all of the filler material from the structural skeleton subsequent to the outer encasement molding step.

11. The process of claim 10, wherein the filling step comprises filling the one or more voids of the structural skeleton with small rigid pellets, and wherein the structural skeleton comprises an elongated tubular member having a fiber-resin jacket and one or more reinforcing cores disposed within the fiber-resin jacket.

* * * * *